United States Patent
Zewail et al.

(10) Patent No.: US 11,736,221 B2
(45) Date of Patent: Aug. 22, 2023

(54) OVERHEAD PARAMETER FOR A SINGLE TRANSPORT BLOCK OVER MULTIPLE SLOTS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US); Tao Luo, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/183,268

(22) Filed: Feb. 23, 2021

(65) Prior Publication Data

US 2022/0271861 A1    Aug. 25, 2022

(51) Int. Cl.
*H04L 1/00* (2006.01)
*H04L 5/00* (2006.01)
*H04W 72/0446* (2023.01)
*H04W 76/27* (2018.01)
*H04W 72/23* (2023.01)

(52) U.S. Cl.
CPC .......... *H04L 1/0007* (2013.01); *H04L 5/0053* (2013.01); *H04W 72/0446* (2013.01); *H04W 72/23* (2023.01); *H04W 76/27* (2018.02)

(58) Field of Classification Search
CPC .... H04L 1/0007; H04L 5/0053; H04W 76/27; H04W 72/0446; H04W 72/14
USPC .......................................................... 370/329
See application file for complete search history.

(56) References Cited

U.S. PATENT DOCUMENTS

2022/0240281 A1*  7/2022  Wang .................... H04L 5/0053

FOREIGN PATENT DOCUMENTS

CN          111757491 A  * 10/2020
WO       WO-2022152575 A1 *  7/2022

OTHER PUBLICATIONS

U.S. Appl. No. 63/138,677, filed Jan. 18, 2021.*
U.S. Appl. No. 63/138,149, filed Jan. 15, 2021.*

* cited by examiner

*Primary Examiner* — Faisal Choudhury
(74) *Attorney, Agent, or Firm* — Procopio, Cory, Hargreaves & Savitch

(57) ABSTRACT

Aspects presented herein may enable a transmitter or a receiver to determine a size of a TB that spans more than one slot. In one aspect, a transmitter determines a multiple slot overhead parameter size for a TB of a shared channel based on an allocation of multiple slots. The transmitter calculates a number of REs allocated for the TB of the shared channel based on a number of subcarriers in a PRB, a number of scheduled symbols in a slot, a number of REs for DMRS per PRB, the multiple slot overhead parameter size, and a number of allocated PRBs. The transmitter transmits the TB of the shared channel using the calculated number of REs.

26 Claims, 10 Drawing Sheets

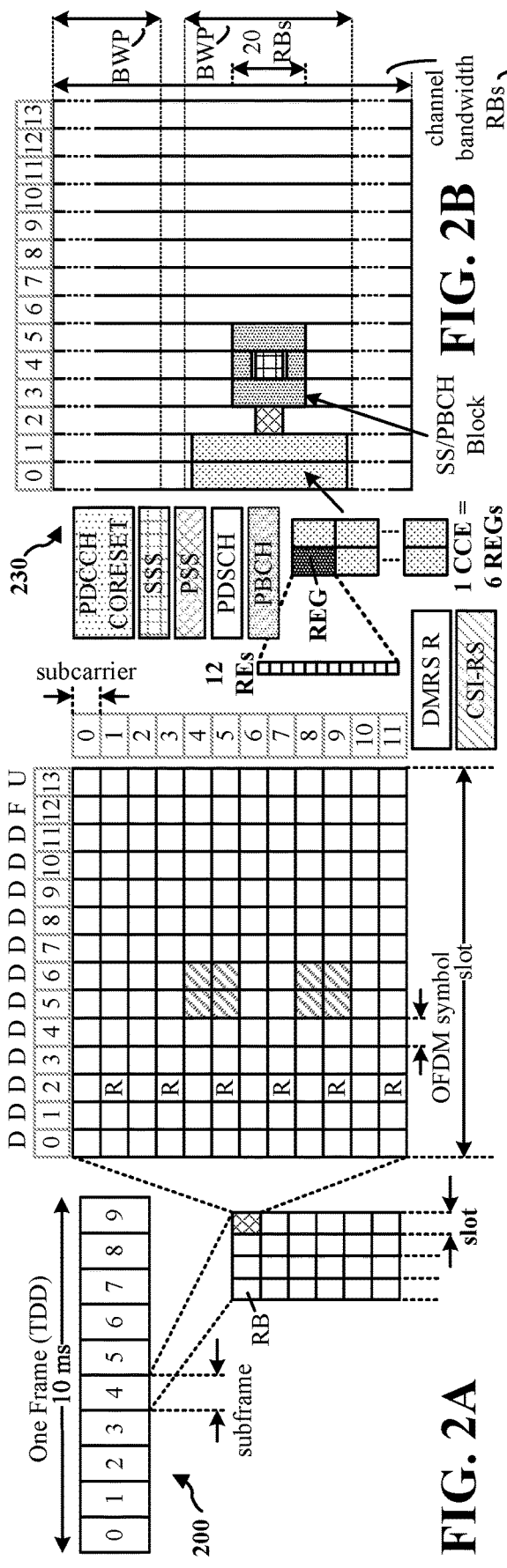
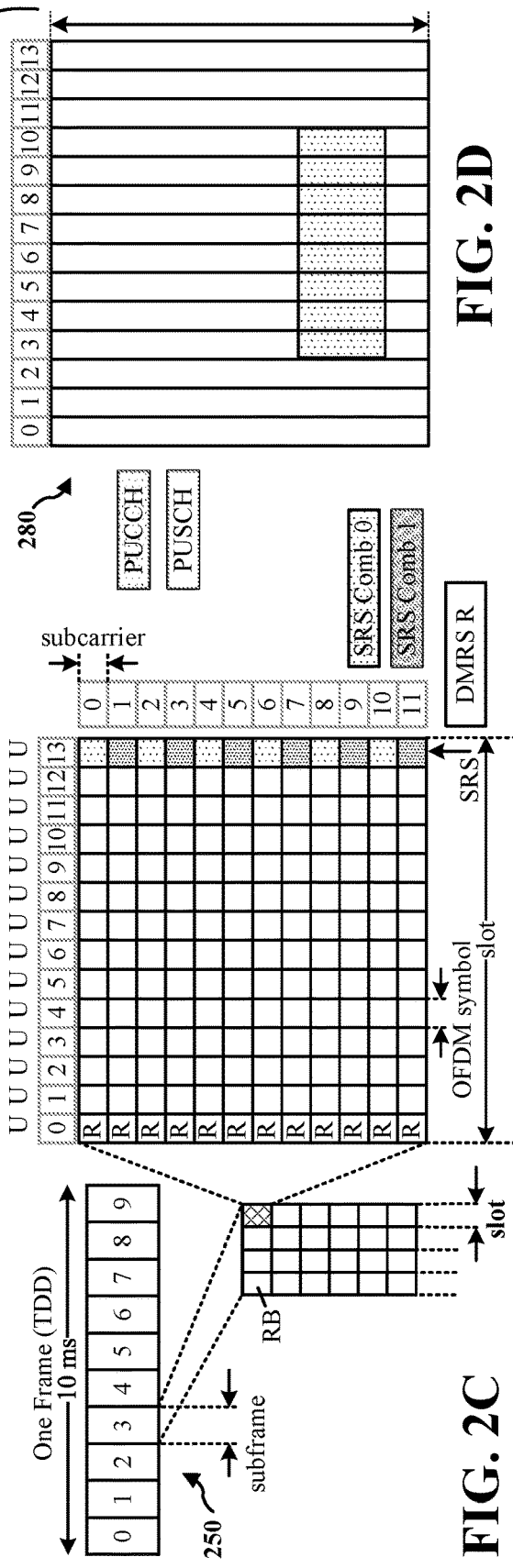
FIG. 2A
FIG. 2B
FIG. 2C
FIG. 2D

OVERHEAD PARAMETER FOR A SINGLE TRANSPORT BLOCK OVER MULTIPLE SLOTS

TECHNICAL FIELD

The present disclosure relates generally to communication systems, and more particularly, to wireless communication involving a transport block.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a transmitter (e.g., a user equipment (UE) or a base station). The apparatus determines a multiple slot overhead parameter size for a transport block (TB) of a shared channel based on an allocation of multiple slots. The apparatus calculates a number of resource elements (REs) allocated for the TB of the shared channel based on a number of subcarriers in a physical resource block (PRB), a number of scheduled symbols in a slot, a number of REs for demodulation reference signal (DMRS) per PRB, the multiple slot overhead parameter size, and a number of allocated PRBs. The apparatus transmits the TB of the shared channel using the calculated number of REs.

In an aspect of the disclosure, a method, a computer-readable medium, and an apparatus are provided for wireless communication of a receiver (e.g., a UE or a base station). The apparatus determines a multiple slot overhead parameter size for a TB of a shared channel based on an allocation of multiple slots. The apparatus calculates a number of REs allocated for the TB of the shared channel based on a number of subcarriers in a PRB, a number of scheduled symbols in a slot, a number of REs for DMRS per PRB, the multiple slot overhead parameter size, and a number of allocated PRBs. The apparatus receives the TB of the shared channel based on the calculated number of REs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
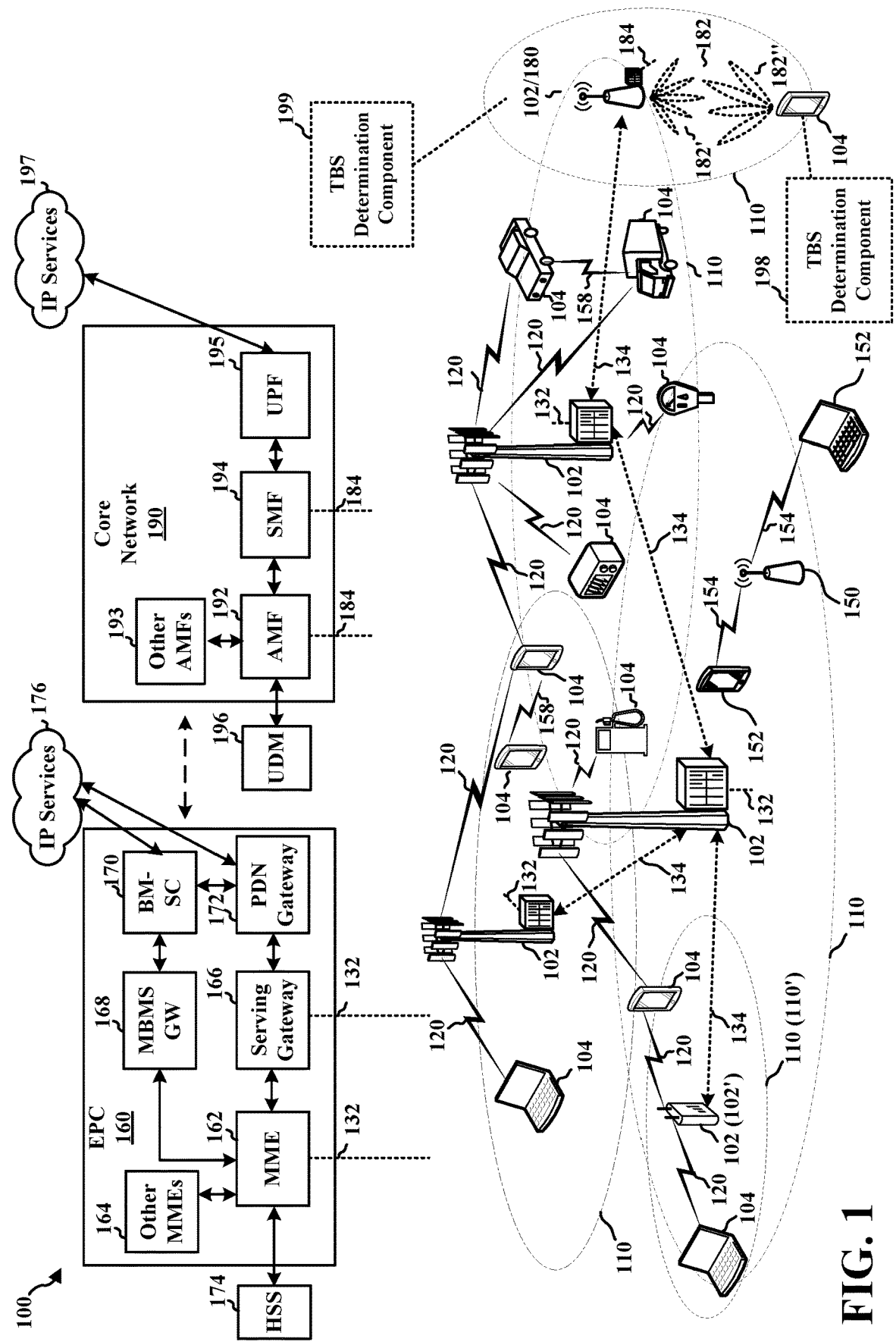
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the base station 102/180 may include a transport block size (TBS) determination component 199 configured to determine a size of a TB that spans more than one slot. In one configuration, the TBS determination component 199 may be configured to determine a multiple slot overhead parameter size for a TB of a shared channel based on an allocation of multiple slots. In such configuration, the TBS determination component 199 may calculate a number of REs allocated for the TB of the shared channel based on a number of subcarriers in a PRB, a number of scheduled symbols in a slot, a number of REs for DMRS per PRB, the multiple slot overhead parameter size, and a number of allocated PRBs. In such configuration, the TBS determination component 199 may transmit the TB of the shared channel using the calculated number of REs and/or receive the TB of the shared channel based on the calculated number of REs.

In certain aspects, the UE 104 may include a TBS determination component 198 configured to determine a size of a TB that spans more than one slot. In one configuration, the TBS determination component 198 may be configured to determine a multiple slot overhead parameter size for a TB of a shared channel based on an allocation of multiple slots. In such configuration, the TBS determination component 198 may calculate a number of REs allocated for the TB of the shared channel based on a number of subcarriers in a PRB, a number of scheduled symbols in a slot, a number of REs for DMRS per PRB, the multiple slot overhead parameter size, and a number of allocated PRBs. In such configuration, the TBS determination component 198 may transmit the TB of the shared channel using the calculated number of REs and/or receive the TB of the shared channel based on the calculated number of REs.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
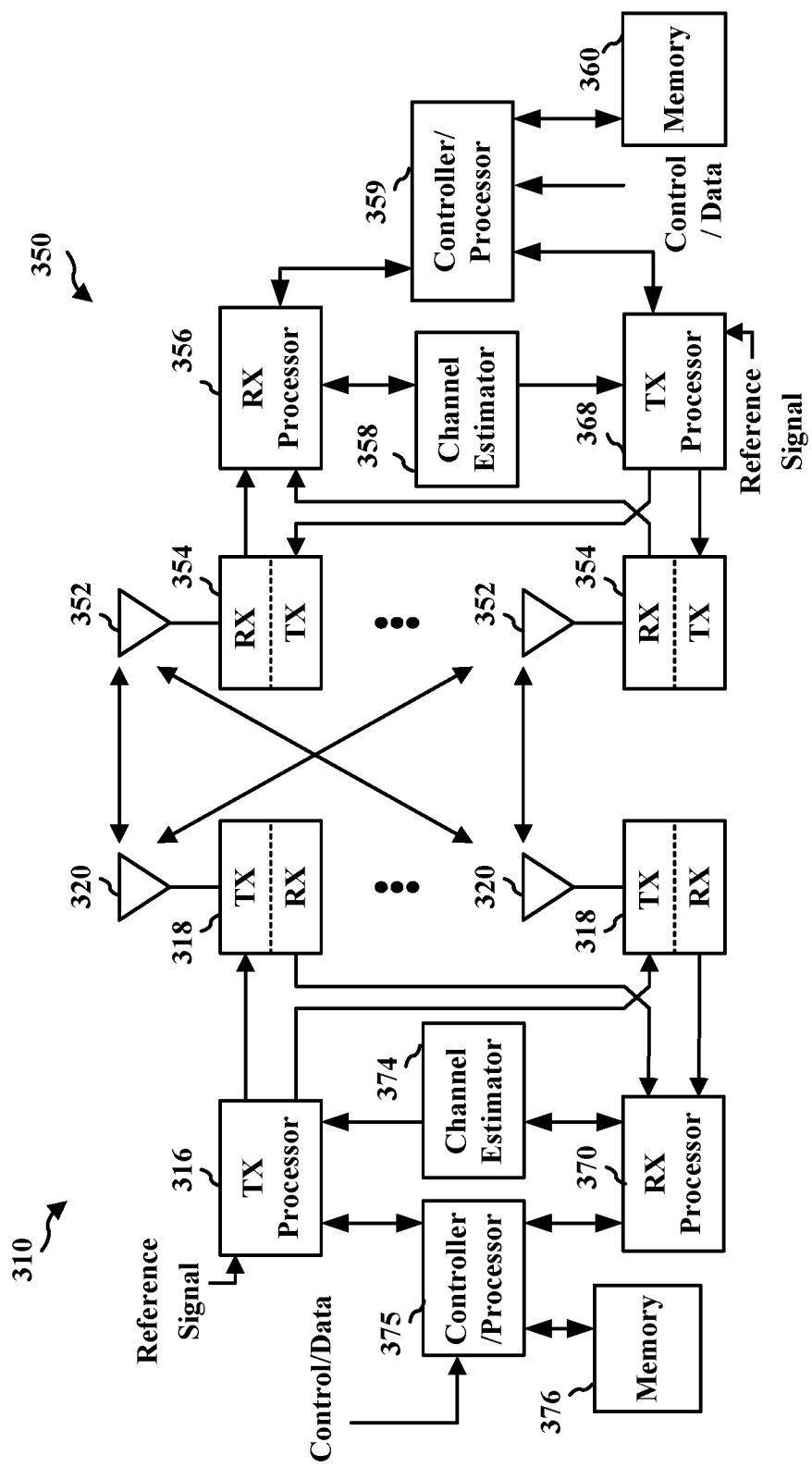
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compressio/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the TBS determination component 198 of FIG. 1.

At least one of the TX processor 316, the RX processor 370, and the controller/processor 375 may be configured to perform aspects in connection with the TBS determination component 199 of FIG. 1.

Figure 4:
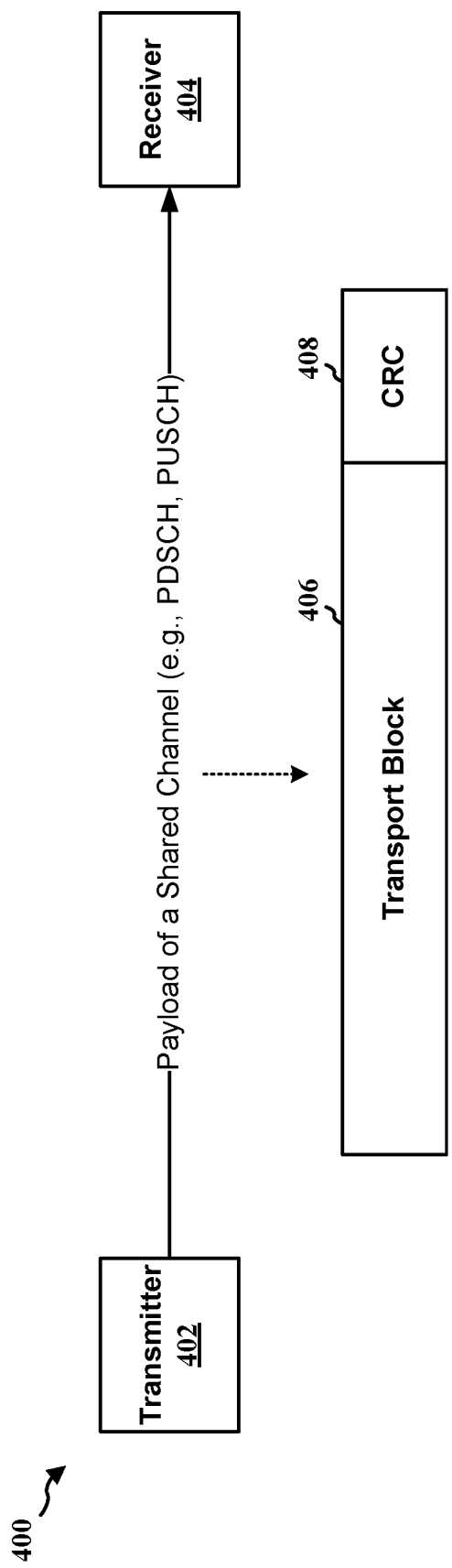
FIG. 4 is a diagram illustrating an example of data transmission from a transmitter to a receiver according to aspects of the present disclosure.

FIG. 4 is a diagram 400 illustrating an example of data transmission from a transmitter to a receiver, which may be applied for a transport block (TB) spanning multiple slots according to aspects of the present disclosure. A transmitting device 402 (e.g., a transmitter of a UE or a base station) may transmit a payload of a shared channel to a receiving device 404 (e.g., a receiver of a UE or a base station) in a TB 406. For example, a base station may transmit a payload of a physical downlink shared channel (PDSCH) in a TB to a UE, or a UE may transmit a payload of a physical uplink shared channel (PUSCH) in a TB to a base station, etc. Prior to transmitting the TB 406, the transmitting device 402 may be configured to determine the transport block size (TBS) of the TB 406 as each TB may have a different size. For example, the size of a TB may vary based on a number of layers, the modulation order, the coding rate, a number of physical resource block (PRB), and/or a transmission duration configured for the TB. The transmitting device 402 may also add a cyclic redundancy check (CRC) 408 scrambling to the TB 406. In some examples, the TBS determination of the TB 406 and the scrambling of the CRC 408 may be processed at a physical layer of the transmitting device 402 before the TB 406 is mapped onto the shared channel for transmission. Similarly, prior to receiving and decoding the TB 406, the receiving device 404 may also be configured to determine the TBS of the TB 406 based on information provided by the transmitting device 402. For example, a UE receiving a data on a PDSCH may determine the TBS of the data before attempting to decode the data, where the UE may receive information related to the TBS of the data from a base station in a radio resource control (RRC) signaling and/or downlink control information (DCI) over a physical downlink control channel (PDCCH) depending on the scheduling type (e.g., semi-static scheduling or dynamic scheduling).

Figure 5:
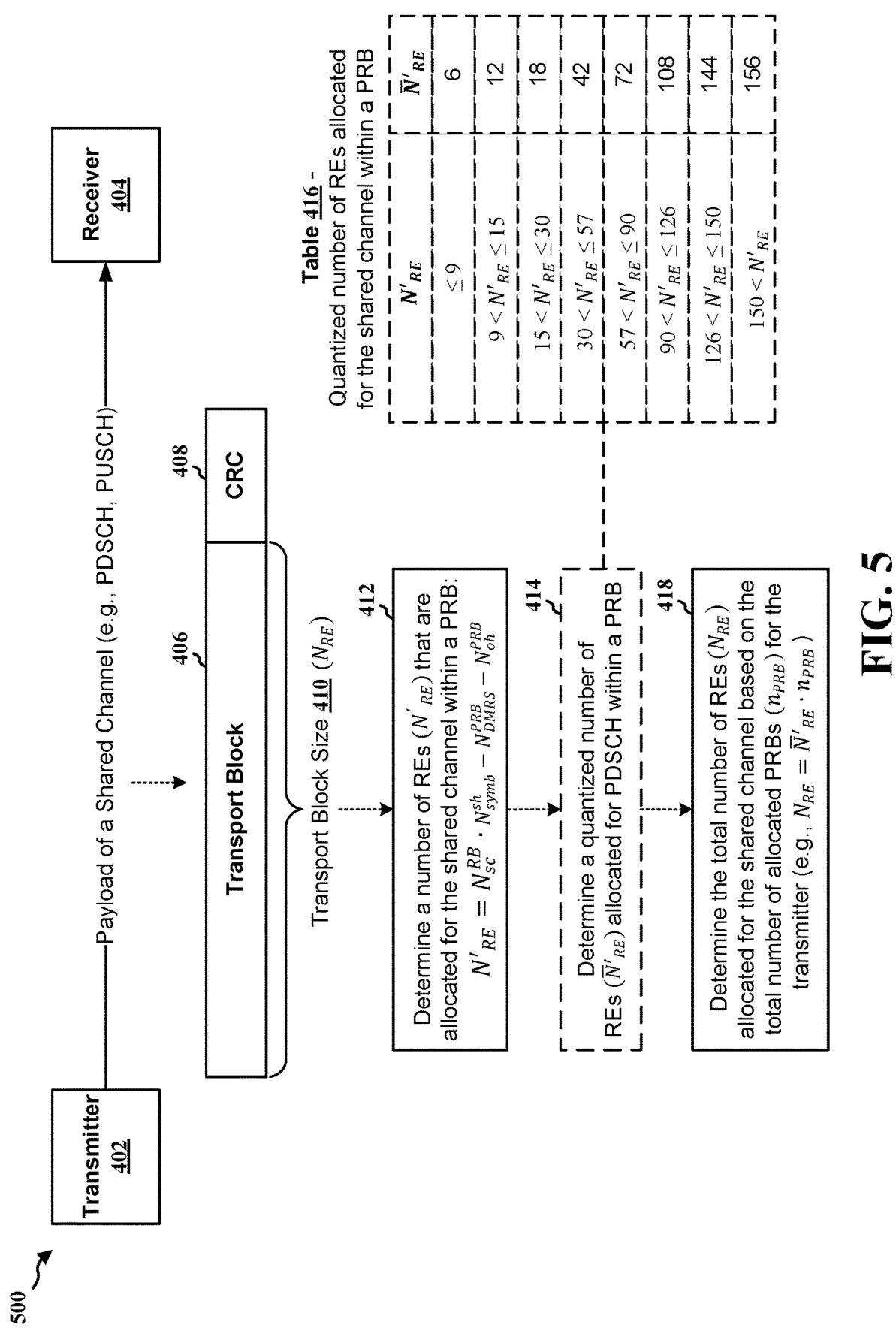
FIG. 5 is a diagram illustrating an example of calculating a size of a TB in a slot according to aspects of the present disclosure.

FIG. 5 is a diagram 500 illustrating an example of calculating a size (e.g., the TBS 410) for a TB (e.g., the TB 406) in a slot. Optional aspects may be illustrated with dashed line. In one example, when a modulation and coding scheme (MCS) field in DCI corresponds to a non-reserved value, the transmitting device 402 and/or the receiving device 404 may determine a number of resource elements (REs) ($N_{RE}$) (e.g., the TBS 410) that are allocated for the TB 406 of the shared channel based on the followings.

At 412, the transmitting device 402 and/or the receiving device 404 may determine a number of resource elements ($N'_{RE}$) that are allocated (e.g., available for data transfer) for the shared channel (e.g., PDSCH, PUSCH, etc.) within a physical resource block (PRB) based on:

$$N'_{RE}N_{sc}^{RB} \cdot N_{symb}^{sh} - N_{DMRS}^{PRB} - N_{oh}^{PRB},$$

where $N_{sc}^{RB}$ may represent a number of subcarriers in a PRB (e.g., 12 subcarriers), $N_{symb}^{sh}$ may represent a number of scheduled symbols (e.g., OFDM symbols) in a slot, $N_{DMRS}^{PRB}$ may represent a number of REs for demodulation reference signal (DMRS) per PRB in a scheduled duration which may also include an overhead of the DMRS code division multiplexing (CDM) groups indicated by a DCI format (e.g., DCI format 1_0/1_1), and $N_{oh}^{PRB}$ may represent an overhead configured by higher layer parameter (e.g., Xoh-PDSCH, Xoh-PUSCH, etc.), which may be a value selected from 0, 6, 12, or 18. In some examples, if the $N_{oh}^{PRB}$ is not configured by the higher layer parameter, the $N_{oh}^{PRB}$ may be set to zero (0). For example, if there are twelve (12) subcarriers in a PRB (e.g., $N_{sc}^{RB}=12$), fourteen (14) scheduled symbols in a slot (e.g., $N_{symb}^{sh}=14$), twelve (12) REs for DMRS per PRB (e.g., $N_{DMRS}^{PRB}=12$), and an overhead configured by higher layer parameter of eighteen (18) REs (e.g., $N_{oh}^{PRB}=18$), then the number of REs (e.g., $N'_{RE}$) that are allocated for the shared channel in a PRB may be 138 REs (e.g., $N'_{RE}=N_{sc}^{RB} \cdot N_{symb}^{sh} - N_{DMRS}^{PRB} - N_{oh}^{PRB}=12 \times 14-12-18=138$).

In some examples, to reduce a number of available sizes for a TB and to provide more flexibility for TBS configuration, a transmitting device and/or a receiving device may be configured to quantize the number of REs allocated for the shared channel within a PRB. For example, as shown at 414, a table 416 that provides an example of quantized number of REs allocated for the shared channel within a PRB may be configured for the transmitting device 402 and/or the receiving device 404, where the transmitting device 402 and/or the receiving device 404 may convert the calculated number of REs (e.g., $N'_{RE}$) that are allocated for the shared channel within a PRB into a quantized number of REs ($\overline{N}'_{RE}$) allocated for the shared channel within a PRB based on the table 416. For example, based on the table 416, if the calculated number of REs is 138 (e.g., $N'_{RE}=138$), then the quantized number of REs ($\overline{N}'_{RE}$) allocated for the shared channel within a PRB may be 144 as the $N'_{RE}$ equals to 144 when the $N'_{RE}$ is greater than 126 but smaller than or equal to 150 (e.g., when $126<N'_{RE}\leq 150$, then $\overline{N}'_{RE}=144$). The example shown in table 416 is merely to illustrate the concept of having a quantized number of REs, and the concepts described herein may be similarly applied to different ranges of REs and for different quantized numbers of REs.

At 418, the transmitting device 402 and/or the receiving device 404 may determine the total number of REs allocated for the shared channel (e.g., the $N_{RE}$ or the TBS 410) by multiplying the calculated number of REs (e.g., $N'_{RE}$ if quantization is not applied) or the quantized number of REs (e.g., $\overline{N}'_{RE}$ if quantization is applied) with a total number of allocated PRBs ($n_{pRB}$) configured for the transmitting device 402, e.g., $N_{RE}=N'_{RE} \cdot n_{PRB}$ or $N_{RE}=\overline{N}'_{RE} \cdot n_{PRB}$, etc. For example, if the calculated number of REs is 138 (e.g., $N'_{RE}=138$) and seven (7) PRBs are allocated for the transmitting device 402, then the total number of REs allocated for the shared channel (e.g., total REs available for data transfer or the TBS 410) may be 966 REs ($N_{RE}=N'_{RE} \cdot n_{PRB}=138 \times 7=966$) if the quantization does not apply, or may be 1008 REs ($N_{RE}=\overline{N}'_{RE} \cdot n_{PRB}=144 \times 7=966$) if the quantization applies. For the TBS calculation discussed in connection with FIG. 4, the size of the RRC overhead may be independent of the total length of the granted allocation.

In some aspects, a single TB may span more than one slot, which may provide communication coverage enhancement for wireless devices when the wireless devices are communicating at higher frequency ranges, such as the FR2. For example, a TB that spans more than one slot may reduce the control channel (e.g., PDCCH) monitoring for a UE and may save some hybrid automatic repeat request (HARQ) IDs for larger subcarrier spacing (SCS) in 60 GHz band. Aspects presented herein provide a TBS calculation for a TB that spans more than one slot, where an overhead parameter for calculating the TBS may be configured to be dependent on a number of granted slots, a number of granted start and length indication values (SLIVs), and/or a number of granted symbols for the TB.

Figure 6:
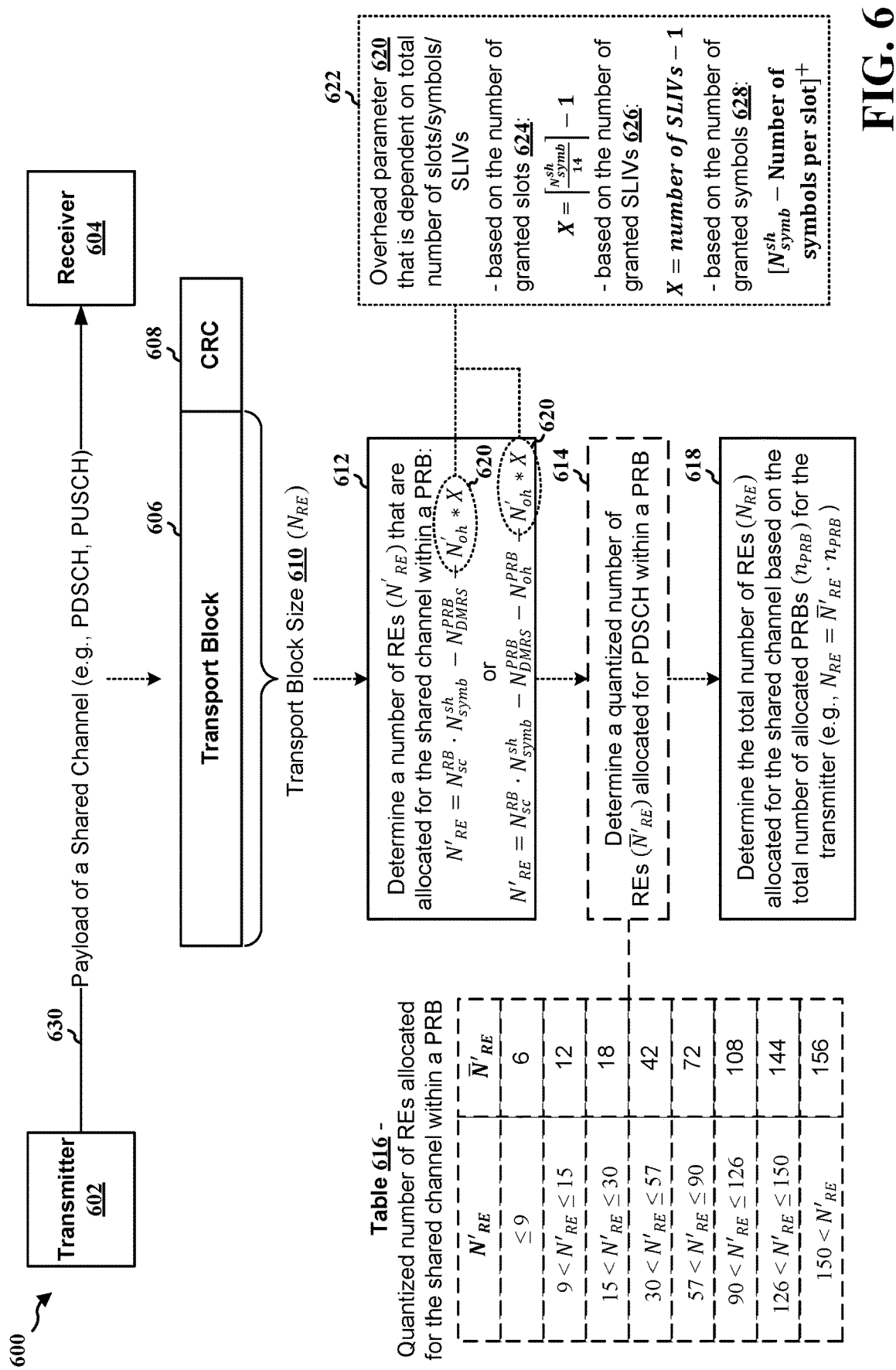
FIG. 6 is a diagram illustrating an example of calculating a size of a TB that spans more than one slot according to aspects of the present disclosure.

FIG. 6 is a diagram 600 illustrating an example of calculating a size of a TB that spans more than one slot according to aspects of the present disclosure, which may include an overhead parameter that is dependent on the total number of slots/symbols/SLIVs allocated for the TB. Optional aspects may be illustrated with dashed line.

In one aspect, a transmitting device 602 (e.g., a transmitter of a UE or a base station) and/or the receiving device 604 (e.g., a receiver of a UE or a base station) may be configured/scheduled to transmit a payload of a shared channel (e.g., a PDSCH, a PUSCH, etc.) to a receiving device 604 (e.g., a receiver of a UE or a base station) in a TB 606. Prior to transmitting the TB 606, the transmitting device 602 may be configured to determine the TBS 610 ($N_{RE}$) of the TB 606. Similarly, prior to receiving the TB 606, the receiving device 604 may also be configured to determine the TBS of the TB 606 based on information provided by the transmitting device 602. For example, a UE receiving a data on a PDSCH may determine the TBS of the data before attempting to decode the data, where the UE may receive information related to the TBS of the data from a base station in an RRC signaling and/or DCI over a PDCCH.

In determining the TBS 610 of the TB 606 (e.g., the total number of REs ($N_{RE}$) allocated for the TB 606 of the shared channel), as shown at 612, the transmitting device 602 and/or the receiving device 604 may first determine a number of REs ($N'_{RE}$) that are allocated for the shared channel (e.g., PDSCH, PUSCH, etc.) within a PRB, where the number of REs may be dependent on an overhead parameter 620 (e.g., $N'_{oh}*X$) that is associated with number of granted slots, number of granted SLIVs and/or number of granted symbols, etc. In one aspect, the overhead parameter 620 may be configured to be an additional overhead parameter that is added to the TBS calculation for TB that does not span for more than one slot (e.g., as described in connection with FIG. 5), such that the number of REs ($N'_{RE}$) that are allocated for the shared channel may be determined based on:

$$N'_{RE}=N_{sc}^{RB} \cdot N_{symb}^{sh} - N_{DMRS}^{RPB} - N_{oh}^{PRB} - N'_{oh}*X.$$

In another example, the overhead parameter 620 may be configured to include an overhead (e.g., $N_{oh}^{PRB}$) configured by higher layer parameter (e.g., Xoh-PDSCH, Xoh-PUSCH, etc.), such that the number of REs ($N'_{RE}$) that are allocated for the shared channel may be determined based on:

$$N'_{RE}=N_{sc}^{RB} \cdot N_{symb}^{sh} - N_{DMRS}^{PRB} - N'_{oh}*X.$$

where the value of the overhead $N'_{oh}$ may take the overhead (e.g., $N_{oh}^{PRB}$) configured by higher layer parameter into consideration.

Similarly, as described in connection with FIG. 5, $NR_{sc}^{RB}$ may represent the number of subcarriers in a PRB, $N_{symb}^{sh}$ may represent the number of scheduled symbols (e.g., OFDM symbols) in a slot, $N_{DMRS}^{PRB}$ may represent the number of REs for DMRS per PRB in the scheduled duration which may also include the overhead of the DMRS CDM groups indicated by a DCI format (e.g., DCI format 1_0/1_1), and $N_{oh}^{PRB}$ may represent the overhead configured by higher layer parameter (e.g., Xoh-PDSCH, Xoh-PUSCH, etc.), which may be a value selected from 0, 6, 12, or 18. In some examples, if the $N_{oh}^{PRB}$ is not configured the higher layer parameter, the $N_{oh}^{PRB}$ may be set to 0.

In one aspect, as shown at 622, the overhead parameter 620 (e.g., $N'_{oh}*X$) may be calculated based on a number of granted slots 624. In one example, $$X = \left\lceil \frac{N_{symb}^{sh}}{14} \right\rceil - 1,$$

where the overhead parameter 620 or the X may be zero (0) when a TB is shorter than a slot. In some examples, the value of the overhead $N'_{oh}$ may take several values from a finite set, and the transmitting device 602 and/or the receiving device 604 may determine an active value from the finite set, such as via an RRC configuration. For example, if there are twelve (12) subcarriers in a PRB (e.g., $NR_{sc}^{RB}=12$), sixteen (16) scheduled symbols in a slot (e.g., $N_{symb}^{sh}=16$), twelve (12) REs for DMRS per PRB (e.g., $N_{DMRS}^{PRB}=12$), an overhead configured by higher layer parameter of eighteen (18) REs (e.g., $N_{oh}^{PRB}=12$), and the value of the overhead $N'_{oh}$ is selected to be six (6), then the number of REs (e.g., $N'_{RE}$) that are allocated for a shared channel in a PRB may be 156 REs, e.g., $N'_{RE}N_{sc}^{RB}\cdot N_{symb}^{sh}-N_{DMRS}^{PRB}N_{oh}^{PRB}-N'_{oh}*X=12\times16-12-18-(6\times1)=156$, where $$X = \left\lceil \frac{N_{symb}^{sh}}{14} \right\rceil - 1 = 1$$

(e.g., X equals to the ceiling function of $[N_{symb}^{sh}/14]$ where $[16/14]=2$).

In another aspect, the overhead parameter 620 (e.g., $N'_{oh}*X$) may be calculated based on a number of granted SLIVs 626, for example X=number of SLIVs−1. Similarly, in some examples, the value of the overhead $N'_{oh}$ may take several values from a finite set, and the transmitting device 602 and/or the receiving device 604 may determine an active value from the finite set, such as via an RRC configuration. For example, if there are twelve (12) subcarriers in a PRB (e.g., $N_{sc}^{RB}=12$), an overhead configured by higher layer parameter of eighteen (18) REs (e.g., $N_{oh}^{PRB}=18$), three (3) granted SLIVs (X=2), each with ten (10) scheduled symbols (e.g., $N_{symb}^{sh}=3\times10=30$), twelve (36) REs for DMRS per PRB (e.g., $N_{DMRS}^{PRB}=36$), e.g., each allocation defined by a SLIV has its own frontloaded DMRS symbol, and the value of the overhead $N'_{oh}$ is selected to be three (3), then the number of REs (e.g., $N'_{RE}$) that are allocated for a shared channel in a PRB may be 286 REs, e.g., $N'_{RE}=N_{sc}^{RB}\cdot N_{symb}^{sh}-N_{DMRS}^{PRB}-N_{oh}^{PRB}-N'_{oh}*X=12\times30-36-18-(2\times10)=286$.

In another aspect, the overhead parameter 620 may be calculated based on a number of granted symbols 628, for example $X=[N_{symb}^{sh}-\text{Number of symbols per slot}]^+$. Similarly, in some examples, the value of the overhead $N'_{oh}$ may take several values from a finite set, and the transmitting device 602 and/or the receiving device 604 may determine an active value from the finite set, such as via an RRC configuration. For example, if there are twelve (12) subcarriers in a PRB (e.g., $N_{sc}^{RB}=12$), twenty eight (28) scheduled symbols (e.g., $N_{symb}^{sh}=28$ and X=14), twelve (12) REs for DMRS per PRB (e.g., $N_{DMRS}^{PRB}=12$), an overhead configured by higher layer parameter of eighteen (18) REs (e.g., $N_{oh}^{PRB}=18$), and the value of the overhead $N'_{oh}$ is selected to be three (3), then the number of REs (e.g., $N'_{RE}$) that are allocated for a shared channel in a PRB may be 256 REs, e.g., $N'_{RE}=N_{sc}^{RB}\cdot N_{symb}^{sh}-N_{DMRS}^{PRB}-N_{oh}^{PRB}-N'_{oh}*X=12\times28-12-18-(3\times14)=256$.

As such, aspects presented herein may enable the overhead parameter 620 or the TBS 610 of the TB 606 to be dependent on the number of granted slots 624, the number of granted SLIVs 626, and/or the number of granted symbols 628 for the TB 606, which may provide the transmitting device 602 and/or the receiving device 604 with more flexibility in determining the size of a TB that spans more than one slot.

In some examples, to reduce a number of available sizes for a TB and to provide more flexibility for TBS configuration, a transmitting device and/or a receiving device may be configured to quantize the number of REs allocated for s shared channel within a PRB. For example, as shown at 614, a table 616 that provides an example of quantized numbers of REs allocated for the shared channel within a PRB may be configured for the transmitting device 602 and/or the receiving device 604, where the transmitting device 602 and/or the receiving device 604 may convert the calculated number of REs (e.g., $N'_{RE}$) that are allocated for the shared channel within a PRB into a quantized number of REs ($\bar{N}'_{RE}$) allocated for the shared channel within a PRB based on the table 616. For example, based on the table 616, if the calculated number of REs is 96 (e.g., $N'_{RE}=96$), then the quantized number of REs ($\bar{N}'_{RE}$) allocated for the shared channel within a PRB may be 108 as when $90<N'_{RE}<126$, $\bar{N}'_{RE}=108$. The example shown in table 616 is merely to illustrate the concept of having a quantized number of REs, and the concepts described herein may be similarly applied to different ranges of REs and for different quantized numbers of REs.

At 618, the transmitting device 602 may determine the total number of REs allocated for the shared channel (e.g., the $N_{RE}$ or the TBS 610) by multiplying the calculated number of REs (e.g., $N'_{RE}$ if quantization is not applied) or the quantized number of REs (e.g., $\bar{N}'_{RE}$ if quantization is applied) with a total number of allocated PRBs ($n_{PRB}$) configured for the transmitting device 602, e.g., $N_{RE}=N'_{RE}\cdot n_{PRB}$ or $N_{RE}=\bar{N}'_{RE}\cdot n_{PRB}$, etc. For example, if the calculated number of REs is 96 (e.g., $N'_{RE}=96$) and seven (7) PRBs are allocated for the transmitting device 602, then the total number of REs allocated for the shared channel (e.g., total REs available for data transfer or the TBS 610) may be 672 REs ($N_{RE}=N'_{RE}\cdot n_{PRB}=96\times7=672$) if quantization does not apply, or may be 756 REs ($N_{RE}=\bar{N}'_{RE}\cdot n_{PRB}=108\times7=756$) if quantization applies.

After determining the total number of REs (e.g., $N_{RE}$) allocated for the shared channel, the transmitting device 602 may transmit the TB 606 of the shared channel using the calculated number of REs (e.g., the TBS 610) and the receiving device 604 may receive the TB 606 based on the calculated number of REs. The transmitting device 602 may also be configured to add a CRC 608 scrambling to the TB 606 prior to the transmission. In some examples, the TBS determination of the TB 606 and the scrambling of the CRC 608 may be processed at a physical layer of the transmitting device 602 before the TB 606 is mapped onto the shared channel for transmission.

Figure 7:
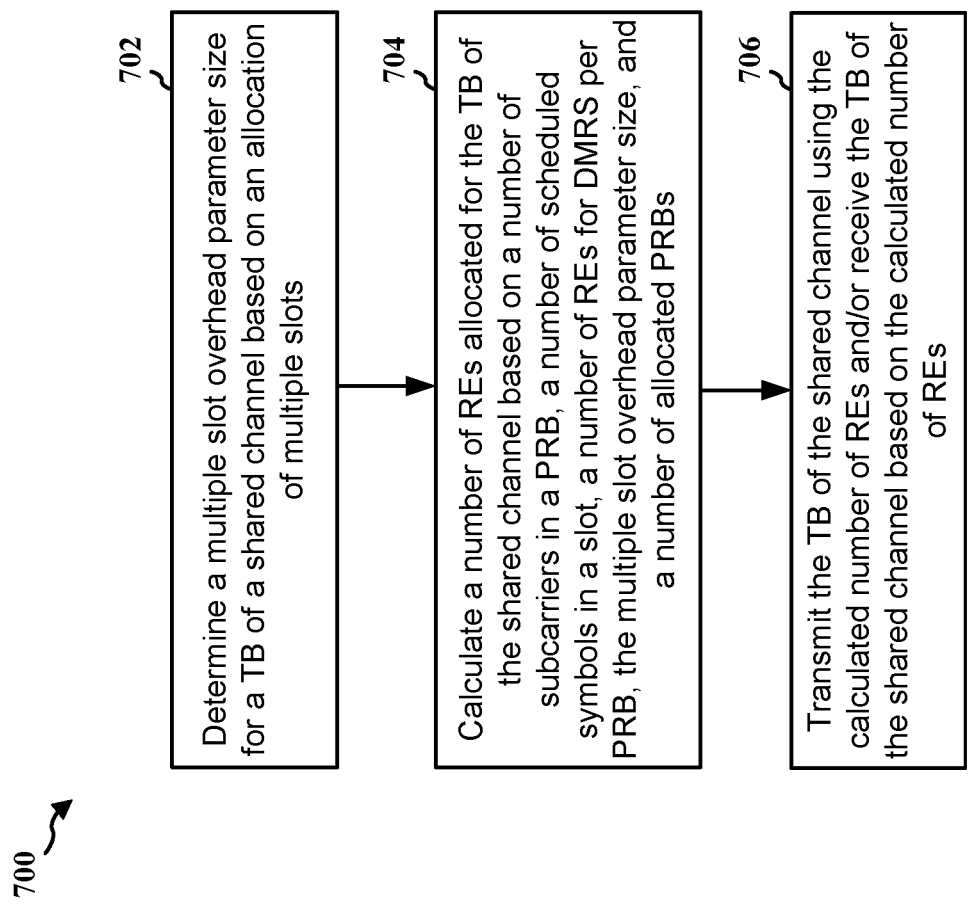
FIG. 7 is a flowchart of a method of wireless communication in accordance with aspects presented herein.

FIG. 7 is a flowchart 700 of a method of wireless communication. The method may be performed by a transmitter such as a base station or a component of a base station (e.g., the transmitting device 402, 602; the receiving device 404, 604; the base station 102, 180, 310; the apparatus 802; a processing system, which may include the memory 376 and which may be the entire base station 310 or a component of the base station 310, such as the TX processor 316 the RX processor 370, and/or the controller/processor 375). Although the aspects of the flowchart are described for a base station in order to illustrate the concept, the method may also be performed by a UE, as a transmitter. Optional aspects are illustrated with a dashed line. The method may enable the base station to determine a size of a TB that spans more than one slot based at least in part on an overhead parameter that is associated with a number of symbols, a number of SLIVs and/or a number of slots granted for the TB.

At 702, the base station may determine a multiple slot overhead parameter size for a TB of a shared channel based on an allocation of multiple slots, such as described in connection with FIG. 6. For example, at 612, the transmitting device 602 and/or the receiving device 604 (which may be a base station) may determine the size of the overhead parameter 620 for the TB 606 of a shared channel that spans for more than a slot. The determination of the multiple slot overhead parameter size may be performed, e.g., by the multiple slot overhead size determination component 840 of the apparatus 802 in FIG. 8. The shared channel may be a PDSCH or a PUSCH.

In one example, the base station (e.g., the transmitter and/or the receiver) may determine the multiple slot overhead parameter size for the TB based on a number of granted slots for the shared channel $$\left(\text{e.g., } X = \left\lceil \frac{N_{symb}^{sh}}{14} \right\rceil - 1\right).$$

In another example, the base station (e.g., the transmitter and/or the receiver) may determine the multiple slot overhead parameter size for the TB based on a number of granted SLIVs for the shared channel that spans the multiple slots (e.g., X=number of SLIVs−1). In another example, the base station (e.g., the transmitter and/or the receiver) may determine the multiple slot overhead parameter size for the TB based on a number of granted symbols for the shared channel, where the shared channel may span the multiple slots (e.g., X=[$N_{symb}^{sh}$−Number of symbols per slot]$^+$). The multiple slot overhead parameter size for the TB of the shared channel may be determined based on a set of defined values for multiple slot allocations, where the multiple slot overhead parameter size for the TB of the shared channel may be configured by a base station via an RRC configuration.

At 704, the base station may calculate a number of REs allocated for the TB of the shared channel based on a number of subcarriers in a PRB, a number of scheduled symbols in a slot, a number of REs for DMRS per PRB, the multiple slot overhead parameter size, and a number of allocated PRBs, such as described in connection with FIG. 6. For example, at 612, 614 and 618, the transmitting device 602 and/or the receiving device 604 (which may be a base station) may calculate a number of REs allocated for the TB of the shared channel ($N_{RE}$) based on a number of subcarriers in a PRB ($N_{sc}^{RB}$), a number of scheduled symbols in a slot ($N_{symb}^{sh}$), a number of REs for DMRS per PRB ($N_{DMRS}^{PRB}$), the multiple slot overhead parameter size ($N'_{oh}*X$), and a number of allocated PRBs ($n_{PRB}$). The calculation of the number of REs allocated for the TB of the shared channel may be performed, e.g., by the REs calculation component 842 of the apparatus 802 in FIG. 8. In some examples, the number of REs for the DMRS per PRB may include an overhead of one or more DMRS CDM groups. In other examples, the base station may calculate the number of REs allocated for the TB further based on a higher layer configured overhead (e.g., $N_{oh}^{PRB}$).

In one example, the calculation of the number of REs allocated for the TB of the shared channel (e.g., $N_{RE}$) may include: calculating a number of REs allocated for each PRB of the TB of the shared channel (e.g., $N'_{RE}$) by multiplying the number of subcarriers in the PRB (e.g., $N_{sc}^{RB}$) with the number of scheduled symbols in the slot (e.g., $N_{symb}^{sh}$), and subtracting the number of REs for the DMRS per PRB (e.g., $N_{DMRS}^{PRB}$) and the multiple slot overhead parameter size (e.g., the $N_{oh}^{PRB}$ and/or $N'_{oh}*X$) from the multiplied number of subcarriers in the PRB and the number of scheduled symbols in the slot (e.g., $N'_{RE}=N_{sc}^{RB} \cdot N_{symb}^{sh} - N_{DMRS}^{PRB} -$ $N_{oh}^{PRB} - N'_{oh}*X$); determining a quantized number of REs allocated for each PRB of the TB of the shared channel (e.g., $\bar{N}'_{RE}$) by mapping the calculated number of REs allocated for each PRB to a value with a set of defined values (e.g., as described in connection with 614 of FIG. 6); and multiplying the quantized number of REs allocated for each PRB of the TB of the shared channel with the number of allocated PRBs (e.g., $n_{PRB}$) to obtain the number of REs allocated for the TB of the shared channel (e.g., $N_{RE}=\bar{N}'_{RE} \cdot n_{PRB}$).

In another example, the calculation of the number of REs allocated for the TB of the shared channel (e.g., $N_{RE}$) may include: multiplying the number of subcarriers in the PRB (e.g., $N_{sc}^{RB}$) with the number of scheduled symbols in the slot (e.g., $N_{symb}^{sh}$); subtracting the number of REs for the DMRS per PRB (e.g., $N_{DMRS}^{PRB}$) and the multiple slot overhead parameter size (e.g., the $N_{oh}^{PRB}$ and/or $N'_{oh}*X$) from the multiplied number of subcarriers in the PRB and the number of scheduled symbols in the slot (e.g., $N'_{RE}=N_{sc}^{RB} \cdot N_{symb}^{sh} - N_{DMRS}^{PRB} - N_{oh}^{PRB} - N'_{oh}*X$); and multiplying the number of allocated PRBs (e.g., $n_{PRB}$) with the multiplied number of subcarriers in the PRB and the number of scheduled symbols in the slot after subtracting the number of REs for the DMRS per PRB and the multiple slot overhead parameter size (e.g., $N_{RE}=N'_{RE} n_{PRB}$).

At 706, the base station may transmit the TB of the shared channel using the calculated number of REs and/or receive the TB of the shared channel based on the calculated number of REs, such as described in connection with FIG. 6. For example, at 630, the transmitting device 602 and/or the receiving device 604 (which may be a base station) may transmit the TB 606 using the calculated number of REs (e.g., the TBS 610) and/or receive the TB 606 based on the calculated number of REs. The transmission and/or reception of the TB may be performed, e.g., by the TB communication component 844, the transmission component 834, and/or the reception component 830 of the apparatus 802 in FIG. 8.

Figure 8:
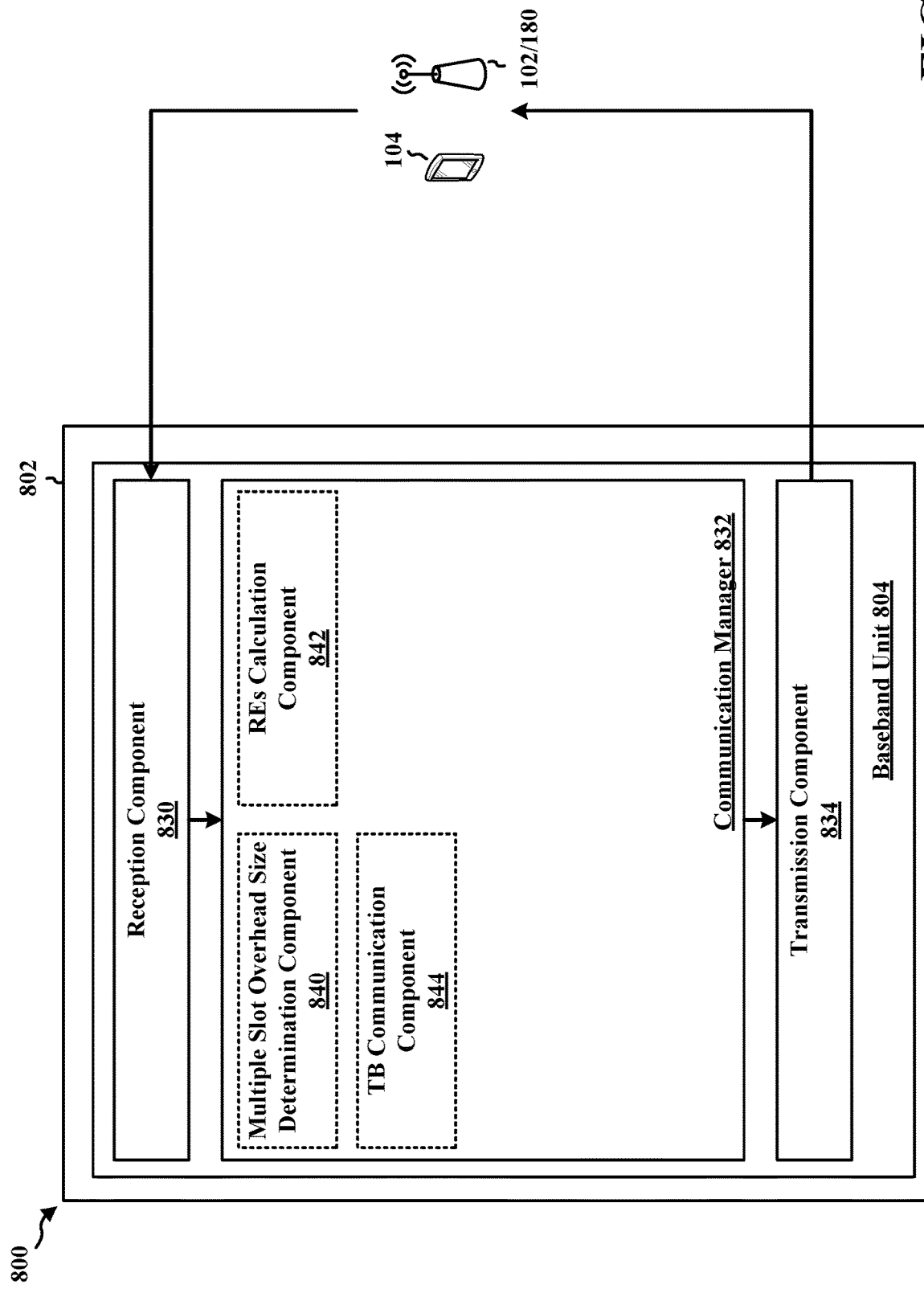
FIG. 8 is a diagram illustrating an example of a hardware implementation for an example apparatus in accordance with aspects presented herein.

FIG. 8 is a diagram 800 illustrating an example of a hardware implementation for an apparatus 802. The apparatus 802 may correspond to a base station or a UE and includes a baseband unit 804. The baseband unit 804 may communicate through a cellular RF transceiver with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the base station 310 or a UE 350 and may include the memory 376 or 360 and/or at least one of the TX processor 316 or 368, the RX processor 370 or 356, and the controller/processor 375 or 359.

The communication manager 832 includes a multiple slot overhead size determination component 840 that is configured to determine a multiple slot overhead parameter size for a TB of a shared channel based on an allocation of multiple slots, e.g., as described in connection with 702 of FIG. 7.

The communication manager 832 further includes a REs calculation component 842 that is configured to calculate a number of REs allocated for the TB of the shared channel based on a number of subcarriers in a PRB, a number of scheduled symbols in a slot, a number of REs for DMRS per PRB, the multiple slot overhead parameter size, and a number of allocated PRBs, e.g., as described in connection with 704 of FIG. 7. The communication manager 832 may further include a TB communication component 844 that is configured to transmit the TB of the shared channel using the calculated number of REs and/or receive the TB of the shared channel based on the calculated number of REs, e.g., as described in connection with 706 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for determining a multiple slot overhead parameter size for a TB of a shared channel based on an allocation of multiple slots (e.g., the multiple slot overhead size determination component 840). The apparatus 802 includes means for calculating a number of REs allocated for the TB of the shared channel based on a number of subcarriers in a PRB, a number of scheduled symbols in a slot, a number of REs for DMRS per PRB, the multiple slot overhead parameter size, and a number of allocated PRBs (e.g., the REs calculation component 842). The apparatus 802 includes means for transmitting the TB of the shared channel using the calculated number of REs and/or receive the TB of the shared channel based on the calculated number of REs (e.g., the TB communication component 844, the transmission component 834, and/or the reception component 830).

The aforementioned means may be one or more of the aforementioned components of the apparatus 802 configured to perform the functions recited by the aforementioned means. As described supra, the apparatus 802 may include the TX Processor 316 or 368, the RX Processor 370 or 356, and the controller/processor 375 or 359. As such, in one configuration, the aforementioned means may be the TX Processor 316 or 368, the RX Processor 370 or 356, and the controller/processor 375 or 359 configured to perform the functions recited by the aforementioned means.

Figure 9:
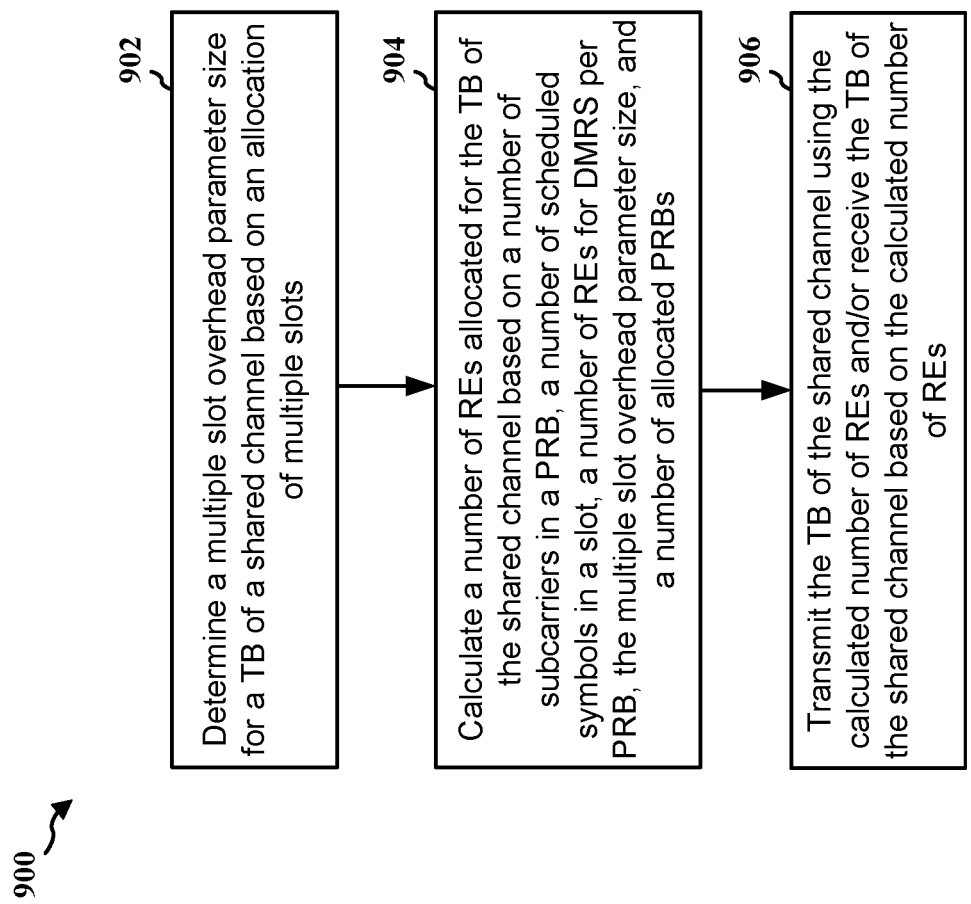
FIG. 9 is a flowchart of a method of wireless communication in accordance with aspects presented herein.

FIG. 9 is a flowchart 900 of a method of wireless communication. The method may be performed by a receiver such as a UE or a component of a UE (e.g., the transmitting device 402, 602; the receiving device 404, 604; the UE 104, 350; the apparatus 1002; a processing system, which may include the memory 360 and which may be the entire UE 350 or a component of the UE 350, such as the TX processor 368, the RX processor 356, and/or the controller/processor 359). Although the aspects of the flowchart are described for a UE in order to illustrate the concept, the method may also be performed by a base station receiving a transmission. Optional aspects are illustrated with a dashed line. The method may enable the UE to determine a size of a TB that spans more than one slot based at least in part on an overhead parameter that is associated with a number of symbols, a number of SLIVs and/or a number of slots granted for the TB.

At 902, the UE may determine a multiple slot overhead parameter size for a TB of a shared channel based on an allocation of multiple slots, such as described in connection with FIG. 6. For example, at 612, the transmitting device 602 and/or the receiving device 604 (which may be a UE) may determine the size of the overhead parameter 620 for the TB 606 of a shared channel that spans for more than a slot. The determination of the multiple slot overhead parameter size may be performed, e.g., by the multiple slot overhead size determination component 1040 of the apparatus 1002 in FIG. 10. The shared channel may be a PDSCH or a PUSCH.

In one example, the UE (e.g., the transmitter and/or the receiver) may determine the multiple slot overhead parameter size for the TB based on a number of granted slots for the shared channel $$\left(\text{e.g., } X = \left\lceil \frac{N_{symb}^{sh}}{14} \right\rceil - 1 \right).$$

In another example, the UE (e.g., the transmitter and/or the receiver) may determine the multiple slot overhead parameter size for the TB based on a number of granted SLIVs for the shared channel that spans the multiple slots (e.g., X=number of SLIVs−1). In another example, the UE (e.g., the transmitter and/or the receiver) may determine the multiple slot overhead parameter size for the TB based on a number of granted symbols for the shared channel, where the shared channel may span the multiple slots (e.g., X= $[N_{symb}^{sh}$–Number of symbols per slot$]^+$). The multiple slot overhead parameter size for the TB of the shared channel may be determined based on a set of defined values for multiple slot allocations, where the multiple slot overhead parameter size for the TB of the shared channel may be configured by a base station via an RRC configuration.

At 904, the UE may calculate a number of REs allocated for the TB of the shared channel based on a number of subcarriers in a PRB, a number of scheduled symbols in a slot, a number of REs for DMRS per PRB, the multiple slot overhead parameter size, and a number of allocated PRBs, such as described in connection with FIG. 6. For example, at 612, 614 and 618, the transmitting device 602 and/or the receiving device 604 (which may be a UE) may calculate a number of REs allocated for the TB of the shared channel ($N_{RE}$) based on a number of subcarriers in a PRB ($N_{sc}^{RB}$), a number of scheduled symbols in a slot ($N_{symb}^{sh}$), a number of REs for DMRS per PRB ($N_{DMRS}^{PRB}$), the multiple slot overhead parameter size ($N'_{oh}*X$), and a number of allocated PRBs ($n_{PRB}$). The calculation of the number of REs allocated for the TB of the shared channel may be performed, e.g., by the REs calculation component 1042 of the apparatus 1002 in FIG. 10. In some examples, the number of REs for the DMRS per PRB may include an overhead of one or more DMRS CDM groups. In other examples, the UE may calculate the number of REs allocated for the TB further based on a higher layer configured overhead (e.g., $N_{oh}^{PRB}$).

In one example, the calculation of the number of REs allocated for the TB of the shared channel (e.g., $N_{RE}$) may include: calculating a number of REs allocated for each PRB of the TB of the shared channel (e.g., $N'_{RE}$) by multiplying the number of subcarriers in the PRB (e.g., $N_{sc}^{RB}$) with the number of scheduled symbols in the slot (e.g., $N_{symb}^{sh}$), and subtracting the number of REs for the DMRS per PRB (e.g., $NE_{DMRS}^{PRB}$) and the multiple slot overhead parameter size (e.g., the $N_{oh}^{PRB}$ and/or $N'_{oh}*X$) from the multiplied number of subcarriers in the PRB and the number of scheduled symbols in the slot (e.g., $N'_{RE} = N_{sc}^{RB} \cdot N_{symb}^{sh} - N_{DMRS}^{PRB} - N_{oh}^{PRB} - N'_{oh}*X$); determining a quantized number of REs allocated for each PRB of the TB of the shared channel (e.g., $\overline{N}'_{RE}$) by mapping the calculated number of REs allocated for each PRB to a value with a set of defined values (e.g., as described in connection with 614 of FIG. 6); and multiplying the quantized number of REs allocated for each PRB of the TB of the shared channel with the number of allocated PRBs (e.g., $n_{PRB}$) to obtain the number of REs allocated for the TB of the shared channel (e.g., $N_{RE} = \overline{N}'_{RE} \cdot n_{PRB}$).

In another example, the calculation of the number of REs allocated for the TB of the shared channel (e.g., $N_{RE}$) may include: multiplying the number of subcarriers in the PRB (e.g., $N_{sc}^{RB}$) with the number of scheduled symbols in the slot (e.g., $N_{symb}^{sh}$); subtracting the number of REs for the DMRS per PRB (e.g., $N_{DMRS}^{PRB}$) and the multiple slot overhead parameter size (e.g., the $N_{oh}^{PRB}$ and/or $N'_{oh}*X$) from the multiplied number of subcarriers in the PRB and the number of scheduled symbols in the slot (e.g., $N'_{RE} = N_{sc}^{RB} \cdot N_{symb}^{sh} - N_{DMRS}^{PRB} - N_{oh}^{PRB} - N'_{oh}*X$); and multiplying the number of allocated PRBs (e.g., $n_{PRB}$) with the multiplied number of subcarriers in the PRB and the number of scheduled symbols in the slot after subtracting the number of REs for the DMRS per PRB and the multiple slot overhead parameter size (e.g., $N_{RE} = N'_{RE} \cdot n_{PRB}$).

At 906, the UE may transmit the TB of the shared channel using the calculated number of REs and/or receive the TB of the shared channel based on the calculated number of REs, such as described in connection with FIG. 6. For example, at 630, the transmitting device 602 and/or the receiving device 604 (which may be a UE) may transmit the TB 606 using the calculated number of REs (e.g., the TBS 610) and/or receive the TB 606 based on the calculated number of REs. The transmission and/or reception of the TB may be performed, e.g., by the TB communication component 1044, the transmission component 1034, and/or the reception component 1030 of the apparatus 1002 in FIG. 10.

Figure 10:
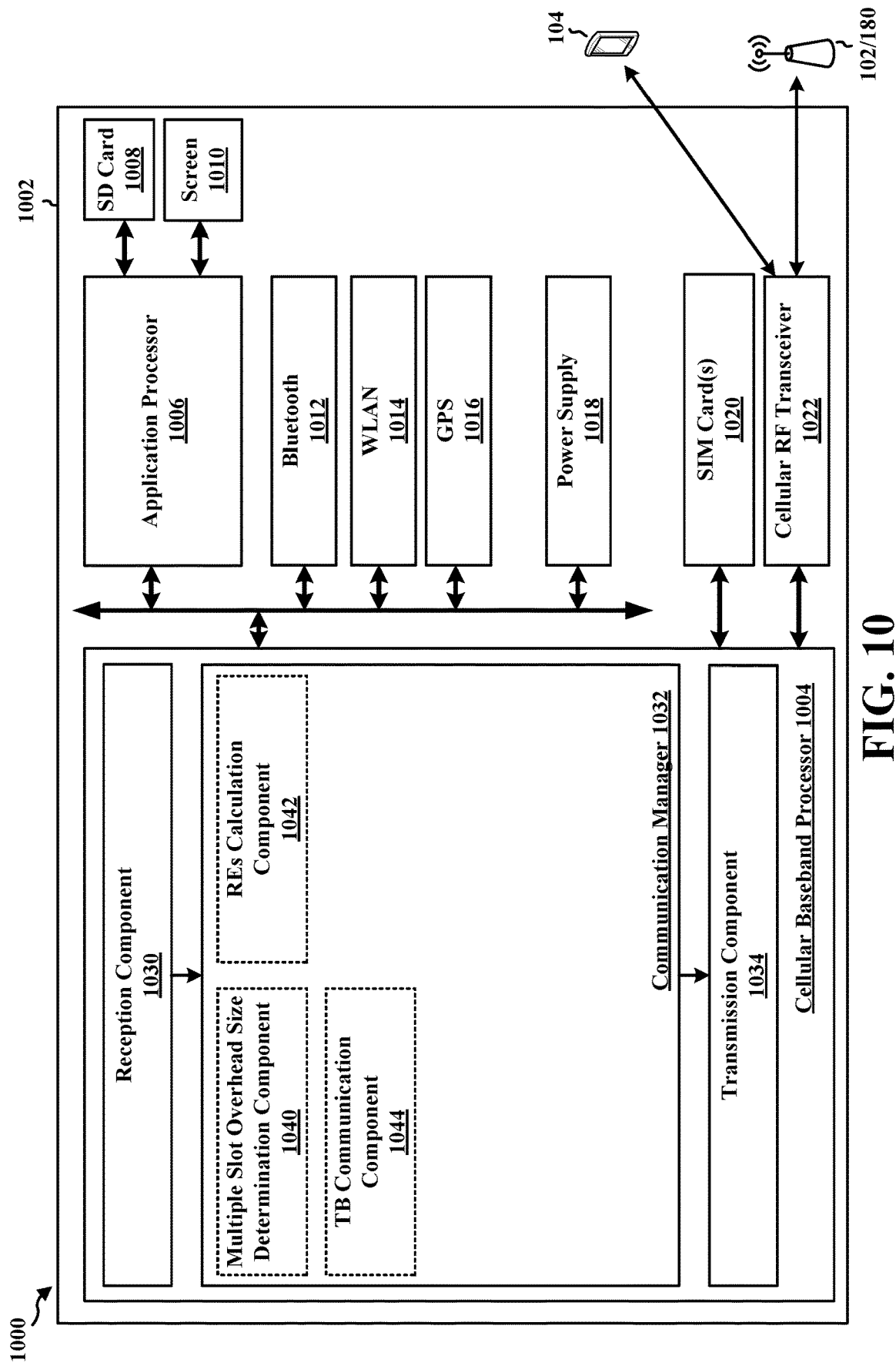
FIG. 10 is a diagram illustrating an example of a hardware implementation for an example apparatus in accordance with aspects presented herein.

FIG. 10 is a diagram 1000 illustrating an example of a hardware implementation for an apparatus 1002. The apparatus 1002 may be a UE or a base station and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or the base station 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 or the base station 310 and may include the memory 360 or 376 and/or at least one of the TX processor 368 or 316, the RX processor 356 or 370, and the controller/processor 359 or 375. In one configuration, the apparatus 1002 may be a modem chip and include just the baseband processor 1004, and in another configuration, the apparatus 1002 may be the entire UE (e.g., see 350 of FIG. 3) or the entire base station 310 and include the aforediscussed additional modules of the apparatus 1002.

The communication manager 1032 includes a multiple slot overhead size determination component 1040 that is configured to determine a multiple slot overhead parameter size for a TB of a shared channel based on an allocation of multiple slots, e.g., as described in connection with 902 of FIG. 9. The communication manager 1032 further includes a REs calculation component 1042 that is configured to calculate a number of REs allocated for the TB of the shared channel based on a number of subcarriers in a PRB, a number of scheduled symbols in a slot, a number of REs for DMRS per PRB, the multiple slot overhead parameter size, and a number of allocated PRBs, e.g., as described in connection with 904 of FIG. 9. The communication manager 1032 may further include a TB communication component 1044 that is configured to transmit the TB of the shared channel using the calculated number of REs and/or receive the TB of the shared channel based on the calculated number of REs, e.g., as described in connection with 906 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for determining a multiple slot overhead parameter size for a TB of a shared channel based on an allocation of multiple slots (e.g., the multiple slot overhead size determination component 1040). The apparatus 1002 includes means for calculating a number of REs allocated for the TB of the shared channel based on a number of subcarriers in a PRB, a number of scheduled symbols in a slot, a number of REs for DMRS per PRB, the multiple slot overhead parameter size, and a number of allocated PRBs (e.g., the REs calculation component 1042). The apparatus 1002 includes means for transmitting the TB of the shared channel using the calculated number of REs and/or receive the TB of the shared channel based on the calculated number of REs (e.g., the TB communication component 1044, the transmission component 1034, and/or the reception component 1030).

The aforementioned means may be one or more of the aforementioned components of the apparatus 1002 configured to perform the functions recited by the aforementioned means. As described supra, the apparatus 1002 may include the TX Processor 368 or 316, the RX Processor 356 or 370, and the controller/processor 359 or 375. As such, in one configuration, the aforementioned means may be the TX Processor 368 or 316, the RX Processor 356 or 370, and the controller/processor 359 or 375 configured to perform the functions recited by the aforementioned means.

The following examples set forth additional aspects and are illustrative only and aspects thereof may be combined with aspects of other embodiments or teaching described herein, without limitation.

Aspect 1 is a method of wireless communication at a transmitter, comprising: determining a multiple slot overhead parameter size for a TB of a shared channel based on an allocation of multiple slots; calculating a number of REs allocated for the TB of the shared channel based on a number of subcarriers in a PRB, a number of scheduled symbols in a slot, a number of REs for DMRS per PRB, the multiple slot overhead parameter size, and a number of allocated PRBs; and transmitting the TB of the shared channel using the calculated number of REs.

In aspect 2, the method of aspect 1 further includes that the transmitter determines the multiple slot overhead parameter size for the TB based on a number of granted slots for the shared channel.

In aspect 3, the method of aspect 1 or aspect 2 further includes that the transmitter determines the multiple slot overhead parameter size for the TB based on a number of granted SLIVs for the shared channel that spans the multiple slots.

In aspect 4, the method of any of aspects 1-3 further includes that the transmitter determines the multiple slot overhead parameter size for the TB based on a number of granted symbols for the shared channel, wherein the shared channel spans the multiple slots.

In aspect 5, the method of any of aspects 1-4 further includes that the shared channel is a PDSCH or a PUSCH.

In aspect 6, the method of any of aspects 1-5 further includes that the number of REs for the DMRS per PRB includes an overhead of one or more DMRS CDM groups.

In aspect 7, the method of any of aspects 1-6 further includes that the transmitter calculates the number of REs allocated for the TB further based on a higher layer configured overhead.

In aspect 8, the method of any of aspects 1-7 further includes that the multiple slot overhead parameter size for the TB of the shared channel is determined based on a set of defined values for multiple slot allocations.

In aspect 9, the method of any of aspects 1-8 further includes that the multiple slot overhead parameter size for the TB of the shared channel is configured by a base station via an RRC configuration.

In aspect 10, the method of any of aspects 1-9 further includes that the calculating the number of REs allocated for the TB of the shared channel further comprises: calculating a number of REs allocated for each PRB of the TB of the shared channel by multiplying the number of subcarriers in the PRB with the number of scheduled symbols in the slot, and subtracting the number of REs for the DMRS per PRB and the multiple slot overhead parameter size from the multiplied number of subcarriers in the PRB and the number of scheduled symbols in the slot; determining a quantized number of REs allocated for each PRB of the TB of the shared channel by mapping the calculated number of REs allocated for each PRB to a value with a set of defined values; and multiplying the quantized number of REs allocated for each PRB of the TB of the shared channel with the number of allocated PRBs to obtain the number of REs allocated for the TB of the shared channel.

In aspect 11, the method of any of aspects 1-10 further includes that the calculating the number of REs allocated for the TB of the shared channel further comprises: multiplying the number of subcarriers in the PRB with the number of scheduled symbols in the slot; subtracting the number of REs for the DMRS per PRB and the multiple slot overhead parameter size from the multiplied number of subcarriers in the PRB and the number of scheduled symbols in the slot; and multiplying the number of allocated PRBs with the multiplied number of subcarriers in the PRB and the number of scheduled symbols in the slot after subtracting the number of REs for the DMRS per PRB and the multiple slot overhead parameter size.

In aspect 12, the method of any of aspects 1-11 further includes that the transmitter is a base station or a UE.

Aspect 13 is an apparatus for wireless communication including at least one processor coupled to a memory and configured to implement a method as in any of aspects 1 to 12.

Aspect 14 is an apparatus for wireless communication including means for implementing a method as in any of aspects 1 to 12.

Aspect 15 is a non-transitory computer-readable medium storing computer executable code, where the code when executed by a processor causes the processor to implement a method as in any of aspects 1 to 12.

Aspect 16 is a method of wireless communication at a receiver, comprising: determining a multiple slot overhead parameter size for a TB of a shared channel based on an allocation of multiple slots; calculating a number of REs allocated for the TB of the shared channel based on a number of subcarriers in a PRB, a number of scheduled symbols in a slot, a number of REs for DMRS per PRB, the multiple slot overhead parameter size, and a number of allocated PRBs; and receiving the TB of the shared channel based on the calculated number of REs.

In aspect 17, the method of aspect 16 further includes that the receiver determines the multiple slot overhead parameter size for the TB based on a number of granted slots for the shared channel.

In aspect 18, the method of aspect 16 or aspect 17 further includes that the receiver determines the multiple slot overhead parameter size for the TB based on a number of granted SLIVs for the shared channel that spans the multiple slots.

In aspect 19, the method of any of aspects 16-18 further includes that the receiver determines the multiple slot overhead parameter size for the TB based on a number of granted symbols for the shared channel, wherein the shared channel spans the multiple slots.

In aspect 20, the method of any of aspects 16-19 further includes that the shared channel is a PDSCH or a PUSCH.

In aspect 21, the method of any of aspects 16-20 further includes that the number of REs for the DMRS per PRB includes an overhead of one or more DMRS CDM groups.

In aspect 22, the method of any of aspects 16-21 further includes that the receiver calculates the number of REs allocated for the TB further based on a higher layer configured overhead.

In aspect 23, the method of any of aspects 16-22 further includes that the multiple slot overhead parameter size for the TB of the shared channel is determined based on a set of defined values for multiple slot allocations.

In aspect 24, the method of any of aspects 16-23 further includes that the multiple slot overhead parameter size for the TB of the shared channel is configured by a base station via an RRC configuration.

In aspect 25, the method of any of aspects 16-24 further includes that the calculating the number of REs allocated for the TB of the shared channel further comprises: calculating a sixth number of REs allocated for each PRB of the TB of the shared channel by multiplying the number of subcarriers in the PRB with the number of scheduled symbols in the slot, and subtracting the number of REs for the DMRS per PRB and the multiple slot overhead parameter size from the multiplied number of subcarriers in the PRB and the number of scheduled symbols in the slot; determining a quantized number of REs allocated for each PRB of the TB of the shared channel by mapping the calculated number of REs allocated for each PRB to a value with a set of defined values; and multiplying the quantized number of REs allocated for each PRB of the TB of the shared channel with the number of allocated PRBs to obtain the number of REs allocated for the TB of the shared channel.

In aspect 26, the method of any of aspects 16-25 further includes that the calculating the number of REs allocated for the TB of the shared channel further comprises: multiplying the number of subcarriers in the PRB with the number of scheduled symbols in the slot; subtracting the number of REs for the DMRS per PRB and the multiple slot overhead parameter size from the multiplied number of subcarriers in the PRB and the number of scheduled symbols in the slot; and multiplying the number of allocated PRBs with the multiplied number of subcarriers in the PRB and the number of scheduled symbols in the slot after subtracting the number of REs for the DMRS per PRB and the multiple slot overhead parameter size.

In aspect 27, the method of any of aspects 16-26 further includes that the receiver is a base station or a UE.

Aspect 28 is an apparatus for wireless communication including at least one processor coupled to a memory and configured to implement a method as in any of aspects 16 to 27.

Aspect 29 is an apparatus for wireless communication including means for implementing a method as in any of aspects 16 to 27.

Aspect 30 is a non-transitory computer-readable medium storing computer executable code, where the code when executed by a processor causes the processor to implement a method as in any of aspects 16 to 27.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication comprising:
a memory; and
at least one processor coupled to the memory, wherein the at least one processor is configured to:
calculate a number of resource elements (REs) allocated for a transport block (TB) of a shared channel based on a number of subcarriers in a physical resource block (PRB), a number of scheduled symbols in a slot, a number of REs for demodulation reference signal (DMRS) per PRB, a multiple slot overhead parameter size for the TB, and a number of allocated PRBs, wherein the multiple slot overhead parameter size is based on a number of granted start and length indicator values (SLIVs) for the shared channel and an allocation of multiple slots, and wherein the shared channel spans the multiple slots; and
transmit the TB of the shared channel using the calculated number of REs.

2. The apparatus of claim 1, wherein the multiple slot overhead parameter size is based on a number of granted slots for the shared channel.

3. The apparatus of claim 1, wherein the multiple slot overhead parameter size is based on a number of granted symbols for the shared channel.

4. The apparatus of claim 1, wherein the shared channel is a physical downlink shared channel (PDSCH) or a physical uplink shared channel (PUSCH).

5. The apparatus of claim 1, wherein the number of REs for the DMRS per PRB includes an overhead of one or more DMRS code division multiplexing (CDM) groups.

6. The apparatus of claim 1, wherein to calculate the number of REs allocated for the TB of the shared channel, the at least one processor is configured to calculate the number of REs allocated for the TB based on a higher layer configured overhead.

7. The apparatus of claim 1, wherein the multiple slot overhead parameter size is based on a set of values for multiple slot allocations.

8. The apparatus of claim 7, wherein the multiple slot overhead parameter size is configured via a radio resource control (RRC) configuration.

9. The apparatus of claim 1, wherein to calculate the number of REs allocated for the TB of the shared channel, the at least one processor is configured to:
   calculate a number of REs allocated for each PRB of the TB of the shared channel based on multiplication of the number of subcarriers in the PRB with the number of scheduled symbols in the slot, and subtraction of the number of REs for the DMRS per PRB and the multiple slot overhead parameter size from the multiplied number of subcarriers in the PRB and the number of scheduled symbols in the slot;
   determine a quantized number of REs allocated for each PRB of the TB of the shared channel by being configured to map the calculated number of REs allocated for each PRB to a value with a set of values; and
   multiply the quantized number of REs allocated for each PRB of the TB of the shared channel with the number of allocated PRBs to obtain the number of REs allocated for the TB of the shared channel.

10. The apparatus of claim 1, wherein to calculate the number of REs allocated for the TB of the shared channel, the at least one processor is configured to:
    multiply the number of subcarriers in the PRB with the number of scheduled symbols in the slot;
    subtract the number of REs for the DMRS per PRB and the multiple slot overhead parameter size from the multiplied number of subcarriers in the PRB and the number of scheduled symbols in the slot; and
    multiply the number of allocated PRBs with the multiplied number of subcarriers in the PRB and the number of scheduled symbols in the slot after subtraction of the number of REs for the DMRS per PRB and the multiple slot overhead parameter size.

11. The apparatus of claim 1, wherein the apparatus is a base station or a user equipment (UE).

12. A method for wireless communication performed by an apparatus, comprising:
    calculating a number of resource elements (REs) allocated for a transport block (TB) of a shared channel based on a number of subcarriers in a physical resource block (PRB), a number of scheduled symbols in a slot, a number of REs for demodulation reference signal (DMRS) per PRB, a multiple slot overhead parameter size for the TB, and a number of allocated PRBs, wherein the multiple slot overhead parameter size is based on a number of granted start and length indicator values (SLIVs) for the shared channel and an allocation of multiple slots, and wherein the shared channel spans the multiple slots; and
    transmitting the TB of the shared channel using the calculated number of REs.

13. The method of claim 12, wherein calculating the number of REs allocated for the TB of the shared channel further:
    calculating a number of REs allocated for each PRB of the TB of the shared channel by multiplying the number of subcarriers in the PRB with the number of scheduled symbols in the slot, and subtracting the number of REs for the DMRS per PRB and the multiple slot overhead parameter size from the multiplied number of subcarriers in the PRB and the number of scheduled symbols in the slot;
    determining a quantized number of REs allocated for each PRB of the TB of the shared channel by mapping the calculated number of REs allocated for each PRB to a value with a set of values; and
    multiplying the quantized number of REs allocated for each PRB of the TB of the shared channel with the number of allocated PRBs to obtain the number of REs allocated for the TB of the shared channel.

14. An apparatus for wireless comprising:
    a memory; and
    at least one processor coupled to the memory, wherein the at least one processor is configured to:
        calculate a number of resource elements (REs) allocated for a transport block (TB) of a shared channel based on a number of subcarriers in a physical resource block (PRB), a number of scheduled symbols in a slot, a number of REs for demodulation reference signal (DMRS) per PRB, a multiple slot overhead parameter size for the TB, and a number of allocated PRBs, wherein the multiple slot overhead parameter size is based on a number of granted start and length indicator values (SLIVs) for the shared channel and an allocation of multiple slots, and wherein the shared channel spans the multiple slots; and
        receive the TB of the shared channel based on the calculated number of REs.

15. The apparatus of claim 14, wherein the multiple slot overhead parameter size for the TB is based on a number of granted slots for the shared channel.

16. The apparatus of claim 14, wherein the multiple slot overhead parameter size for the TB is based on a number of granted symbols for the shared channel.

17. The apparatus of claim 14, wherein the shared channel is a physical downlink shared channel (PDSCH) or a physical uplink shared channel (PUSCH).

18. The apparatus of claim 14, wherein the number of REs for the DMRS per PRB includes an overhead of one or more DMRS code division multiplexing (CDM) groups.

19. The apparatus of claim 14, wherein to calculate the number of REs allocated for the TB, the at least one processor is configured to calculate the number of REs allocated for the TB based on a higher layer configured overhead.

20. The apparatus of claim 14, wherein the multiple slot overhead parameter size for the TB of the shared channel is based on a set of values for multiple slot allocations.

21. The apparatus of claim 20, wherein the multiple slot overhead parameter size for the TB of the shared channel is configured via a radio resource control (RRC) configuration.

22. The apparatus of claim 14, wherein to calculate the number of REs allocated for the TB of the shared channel, the at least one processor is configured:
    calculate a number of REs allocated for each PRB of the TB of the shared channel based on multiplication of the number of subcarriers in the PRB with the number of scheduled symbols in the slot, and subtraction of the number of REs for the DMRS per PRB and the multiple slot overhead parameter size from the multiplied number of subcarriers in the PRB and the number of scheduled symbols in the slot;
    determine a quantized number of REs allocated for each PRB of the TB of the shared channel by being configured to map the calculated number of REs allocated for each PRB to a value with a set of values; and multiply the quantized number of REs allocated for each PRB of the TB of the shared channel with the number of allocated PRBs to obtain the number of REs allocated for the TB of the shared channel.

23. The apparatus of claim 14, wherein to calculate the number of REs allocated for the TB of the shared channel, the at least one processor is configured to:

multiply the number of subcarriers in the PRB with the number of scheduled symbols in the slot;

subtract the number of REs for the DMRS per PRB and the multiple slot overhead parameter size from the multiplied number of subcarriers in the PRB and the number of scheduled symbols in the slot; and multiply the number of allocated PRBs with the multiplied number of subcarriers in the PRB and the number of scheduled symbols in the slot after subtraction of the number of REs for the DMRS per PRB and the multiple slot overhead parameter size.

24. The apparatus of claim 14, wherein the apparatus is a base station or a user equipment (UE).

25. A method for wireless communication performed by an apparatus, comprising:

calculating a number of resource elements (REs) allocated for a transport block (TB) of a shared channel based on a number of subcarriers in a physical resource block (PRB), a number of scheduled symbols in a slot, a number of REs for demodulation reference signal (DMRS) per PRB, a multiple slot overhead parameter size for the TB, and a number of allocated PRBs, wherein the multiple slot overhead parameter size is based on a number of granted start and length indicator values (SLIVs) for the shared channel and an allocation of multiple slots, and wherein the shared channel spans the multiple slots; and receiving the TB of the shared channel based on the calculated number of REs.

26. The method of claim 25, wherein calculating the number of REs allocated for the TB of the shared channel comprises:

calculating a number of REs allocated for each PRB of the TB of the shared channel by multiplying the number of subcarriers in the PRB with the number of scheduled symbols in the slot, and subtracting the number of REs for the DMRS per PRB and the multiple slot overhead parameter size from the multiplied number of subcarriers in the PRB and the number of scheduled symbols in the slot;

determining a quantized number of REs allocated for each PRB of the TB of the shared channel by mapping the calculated number of REs allocated for each PRB to a value with a set of values; and multiplying the quantized number of REs allocated for each PRB of the TB of the shared channel with the number of allocated PRBs to obtain the number of REs allocated for the TB of the shared channel.

* * * * *